United States Patent [19]

Ricklefs

[11] Patent Number: 5,103,572
[45] Date of Patent: Apr. 14, 1992

[54] FEELER PIN USING AN OPTICAL CONTACT SENSOR

[75] Inventor: Ubbo Ricklefs, Greifenstein/Ulm, Fed. Rep. of Germany

[73] Assignee: Wild Leitz Messtechnik GmbH, Wetzlar, Fed. Rep. of Germany

[21] Appl. No.: 542,833

[22] Filed: Jun. 25, 1990

[30] Foreign Application Priority Data

Jun. 24, 1989 [DE] Fed. Rep. of Germany ....... 3920716

[51] Int. Cl.⁵ .............................................. G01B 11/24
[52] U.S. Cl. ........................................ 33/558; 33/559; 33/561; 33/DIG. 4; 33/DIG. 21; 356/358
[58] Field of Search .................. 33/DIG. 4, DIG. 21, 33/556, 558, 559, 561, 560, 707; 356/358

[56] References Cited

U.S. PATENT DOCUMENTS

| | | | |
|---|---|---|---|
| 2,846,919 | 8/1958 | Thompson | 356/358 |
| 4,153,370 | 5/1979 | Corey, III | 356/358 |
| 4,347,441 | 8/1982 | Dil et al. | 356/358 |
| 4,453,082 | 6/1984 | Pryor | 250/561 |
| 4,455,755 | 6/1984 | Fritsche et al. | 33/174 L |
| 4,475,812 | 10/1984 | Buczek et al. | 356/32 |
| 4,513,507 | 4/1985 | Laskowski | 33/558 |
| 4,574,199 | 3/1986 | Pryor | 250/561 |
| 4,655,597 | 4/1987 | Yamamoto et al. | 356/373 |
| 4,694,184 | 9/1987 | Pryor | 33/561 |
| 4,714,246 | 12/1987 | Eichen et al. | 356/358 |
| 4,824,240 | 4/1989 | Myers | 356/358 |
| 4,942,671 | 7/1990 | Enoerle et al. | 33/559 |

FOREIGN PATENT DOCUMENTS

| | | | |
|---|---|---|---|
| 0993011 | 1/1983 | U.S.S.R. | 356/358 |
| 1394034 | 5/1988 | U.S.S.R. | 33/707 |
| 1413421 | 7/1988 | U.S.S.R. | 33/559 |
| 2161934 | 1/1986 | United Kingdom | 33/556 |

OTHER PUBLICATIONS

Roland O. Miles, et al., *An External Cavity Diode Laser Sensor*, Journal of Lightwave Technology, vol. LT-1, No. 1, Mar. 1983.
T. Yoshino, et al., *Laser Diode Feedback Interferometer For Stabilization and Displacement Measurements*, Appl. Optics 26, (1987), pp. 892-897.

Primary Examiner—Thomas B. Will
Attorney, Agent, or Firm—Foley & Lardner

[57] ABSTRACT

A feeler pin having a contact element with a contact sensor, which is constructed as a laser feedback interferometer whose resonator quality is varied by changes in position of the contact element enabling measurement of radiation flux or the internal resistance of the laser. These measurements can then be related to a mechanical contact. The interferometer is preferably arranged inside the feeler pin which is constructed as a tube and the sapphire ball, conventional as contact element is used as a third cavity facet. Different variations are represented.

19 Claims, 4 Drawing Sheets

FEELER PIN USING AN OPTICAL CONTACT SENSOR

BACKGROUND OF THE INVENTION

The invention relates to a feeler pin having an optical contact sensor.

It is known, particularly for 3D measuring machines, to use a contact detecting apparatus or feelers having a feeler pin, which upon contact with a test object, experiences a deflection from which a signal is derived, in order to detect even the most infinitesimal deflections.

In this regard, it is known from German Patent No. 2,937,431, U.S. Pat. No. 4,453,082 and U.S. Pat. No. 4,574,199 that an optical system which has a light source, a mechanically influenced optical element and a light detector can detect a contact. This light source generates a stable luminous flux, which is deflected or blanked out by the optical element, so that the position and/or intensity of the light bundle arriving at the light detector thereafter are influenced.

The U.S. publications teach the use of photodiode arrays as light detectors, whereby a quantitative measurement of the magnitude of the deflection of the contact element, "measuring probe head" is also rendered possible. It is also known from U.S. Pat. No. 4,453,082 that a semiconductor laser diode can be used as a light source.

In the arrangement according to German Patent No. 2,937,431, a mirror is set oscillating by abutting the contact element on the test object. The result of this is that a stationary contact or a deformation of the feeler pin are not detected.

The measurement of changes in position with a laser diode feedback interferometer is known from U.S. Pat. No. 4,655,597 and T. Yoshino et al., Appl. Optics 26 (1987), pages 892-897. In this process, the light emitted by a laser diode is redirected by a mirror onto the laser diode. The mirror therefore acts as a third cavity facet of a combined resonator, which additionally also contains the two end mirrors of the laser diode. A change in the position of the third cavity facet with respect to the laser diode effects a change in the quality of this combined resonator. That is to say, the light emission of the laser diode is influenced by the position of the third resonator. The luminous flux of the laser diode is detected by a photodiode. A control circuit regulates the electrical operating current of the laser diode to stabilize or stably modulate the light emission. Consequently, a relative measurement of position over several μm can be done with a linear signal in an experimental setup such as that shown in T. Yoshino et al. Neither of the publications describes the effects of tilting the mirror.

It is also known from R. 0. Miles et al., J. Lightwave Technology, Vol. 1, No. 1, March 1983, pages 81-93, how to use an optical sensor with a laser diode and an external near-field cavity in order to detect a deflection. In that case, the spacing of the external reflector from the resonator of the laser diode is small by comparison to the length of the resonator, so that the acceleration sensor detects even small angular tiltings of the external reflector.

SUMMARY OF THE INVENTION

It is the object of the present invention to equip a feeler pin with an optical contact sensor which enables particularly high feeling sensitivity even in the case of stationary feeling.

By comparison with the direct optical feeling of an object, an advantage arises in that the optical system is protected against environmental influences, and the optical characteristics of the object play no role. A laser feedback interferometer is an integral component of the feeler.

The feeler pin comprises a contact element for contacting an external object and a laser feedback interferometer, whose external reflector is coupled to the contact element for sensing changes in resonator quality of the laser feedback interferometer, the resonator quality corresponding to changes in position of the contact element. The feeler pin further comprises a unit for measuring radiation flux of a laser in the laser feedback interferometer, the radiation flux being dependent upon the resonator quality. The feeler pin may also comprise a laser in the laser feedback interferometer, which is a laser diode with resistance measuring element for measuring internal resistance of the laser diode, this internal resistance corresponding to the resonator quality. The feeler pin may also comprises a laser in the laser feedback interferometer, which operates in a region of threshold between fluorescence and lasing.

It has been established that the spacing of the external reflector from the laser diode can be large, whereby the feeler is simple to construct. The principle is suitable for both switching and measuring feelers.

Objects and advantages of the invention will become apparent from the following detailed description and the drawings.

DETAILED DESCRIPTION OF THE DRAWINGS

DETAILED DESCRIPTION OF THE PREFERRED EMBODIMENTS

Figure 1:
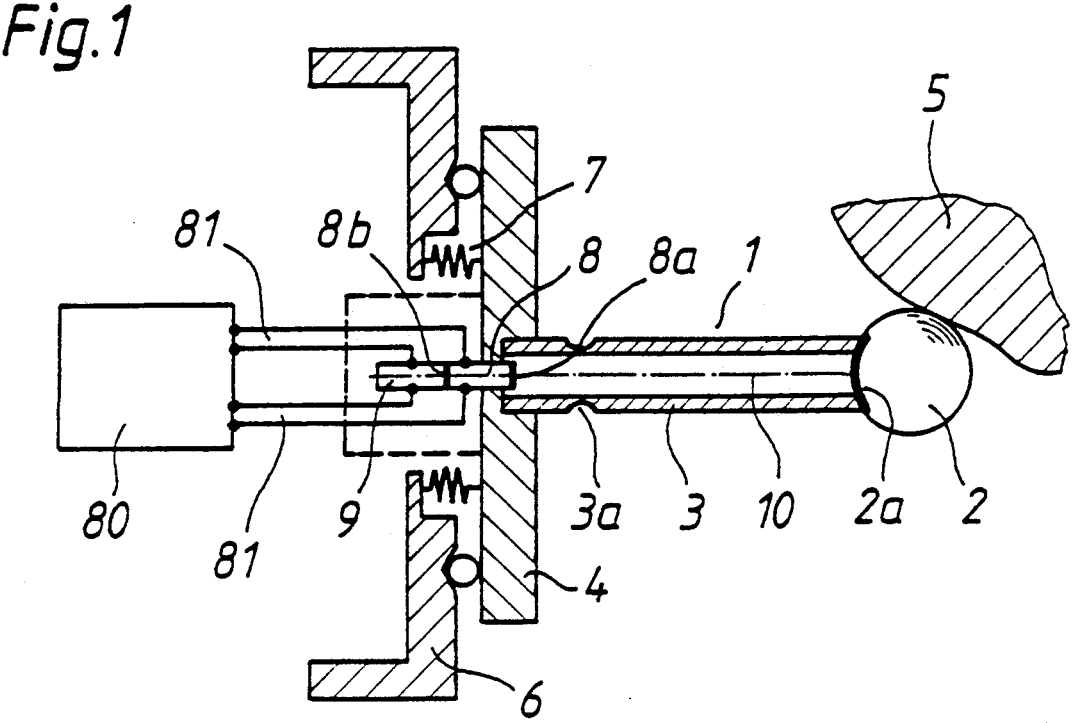
FIG. 1 shows a feeler pin according to the invention for 3D measuring machines.

FIG. 1 shows, firstly, a feeler pin 1 used as a switching feeler pin with 3D measuring machines It has a contact element 2—typically a polished sapphire ball 1—a beam 3 and a base 4.

In order to limit the forces between ball 2 and a test object 5, the base 4 is mounted in a tilting bearing 6, and is fixed there in the rest position by retaining springs 7.

According to the invention, a laser 8 is arranged in the base 4, the beam 3 is embodied as a hollow tube, and the region of the ball 2 lying therein is used as mirror 2a.

The first and second end mirrors 8a, 8b of the laser 8, and the mirror 2a as the third cavity facet form a coupled laser resonator. The laser power is measured by a monitor photodiode 9, which is arranged behind the outer laser mirror 8b.

If the relative position of mirror 2a and laser diode 8 is altered by sliding or tilting, then the feedback, and equally the quality, of the coupled laser resonator is varied. This can be detected by the photodiode 9 as a change in radiation flux. A laser diode 8 is preferably used as laser 8. Suitable laser diodes 8 and monitor photodiodes 9 are commercially available as a complete unit, e.g. Hitachi HL 7806, Sharp LT 030 MD/MF. However, the electrical resistance of the laser diode 8 also changes with the resonator quality and hence that resistance can also be evaluated. It is then possible to omit the photodiode 9. An electronic circuit 80 having terminals 81 serves for supplying power and for evaluation.

It is also possible to modulate the wavelength of the laser diode 8 by modulating the current and/or temperature thereof, for the purpose of measuring the resonator quality.

Since only a small proportion of the luminous flux from the laser diode 8 needs to be reflected by the mirror 2a in order to achieve the above-mentioned effect, the polished sapphire ball, which the contact element 2 can also be used without further processing as the mirror 2a.

The tube used as beam 3 can be very thin and light, since it envelops only the narrow laser beam 10, and is preferably not rigid, in order to be able to affect a detectable change in position of the mirror 2a given the smallest force between contact element 2 and object 5. For this purpose, the tube is advantageous for it to have a bending point 3a near the base 4.

The interior of the tube can be provided with a particular atmosphere, including vacuum, in order to exclude the effects of dust, moisture, and fluctuations in pressure and density on the laser resonator.

Figure 2:
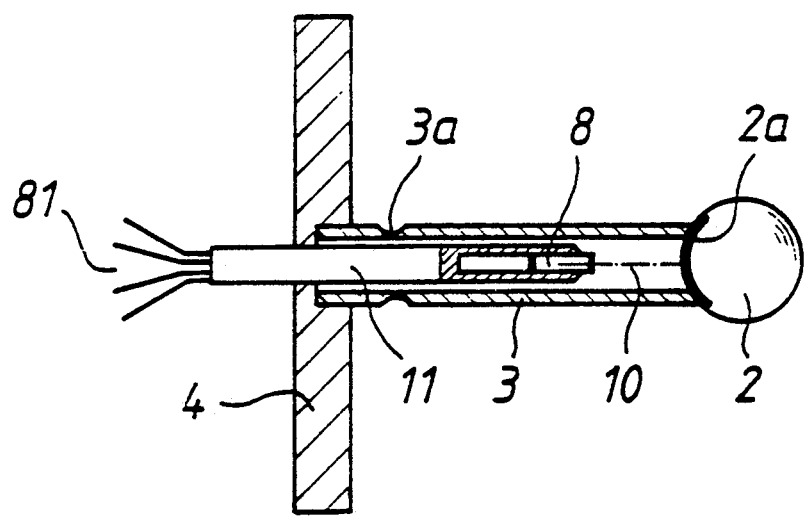
FIG. 2 shows an example in which the feeler pin length and the resonator length are independent of one another.

FIG. 2 shows an arrangement in which the length of the beam 3 and of the feeler pin 1, and the length of the laser resonator are decoupled. The laser diode 8 is fastened to a rigid carrier 11 on the base 4, and projects into the tube up to near the mirror 2a. In the case of a small resonator length, this results in large specific deflections of the mirror 2a relative to the laser diode 8. Since the internal resistance is measured in the example, it is possible to dispense with a photodiode 9 (FIG. 1).

Figure 3:
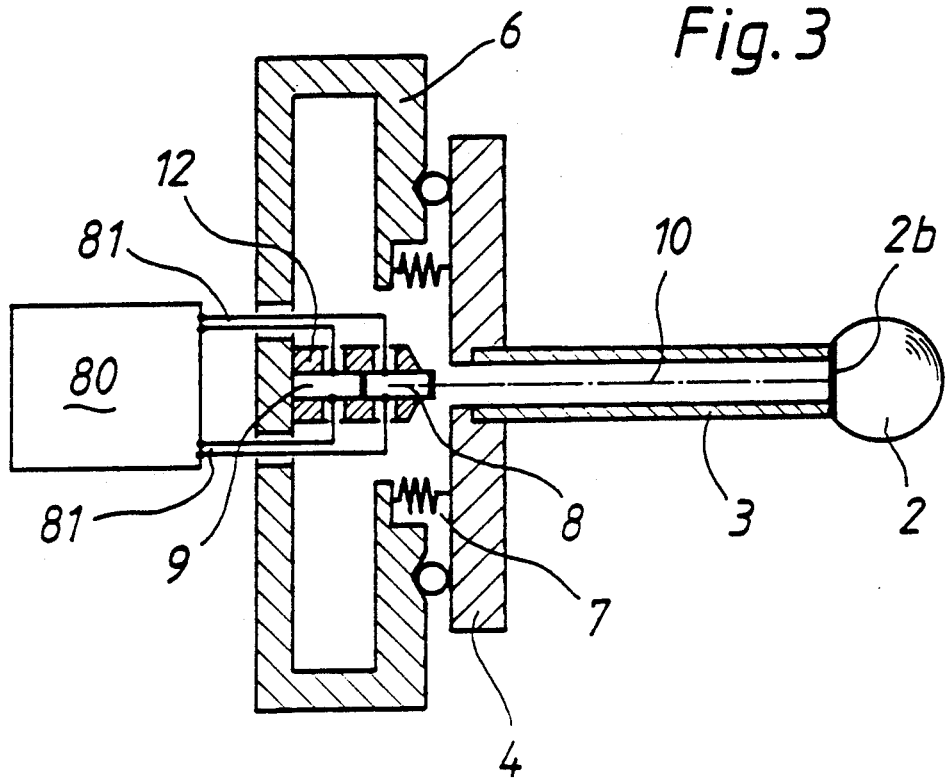
FIG. 3 shows an example which is particularly suitable for exchangeable feeler pins.

The example of FIG. 3 shows an embodiment which is particularly suitable for exchangeable feeler pins. Laser 8 and monitor photodiode 9 are connected with a mount 12 to the tilting bearing 6 near the base 4, and arranged in an extension of the hollow beam 3 of the feeler pin 1. The feeler pin 1 thus contains no active components, and is therefore particularly cost effective to produce as an exchangeable part. In addition, with this arrangement it is possible to detect maladjustments of the basic setting of the feeler pin in the tilting bearing 6.

Furthermore, it is shown that the contact element 2 can also be provided with a specially embodied mirror 2b, which is optimized for the optical system. For example, it is possible to provide a plane mirror 2b having a special coating. The adjustment of laser diode 8 and plane mirror 2b is simplified thereby, but the cost of producing the mirror 2b is increased.

Figure 4:
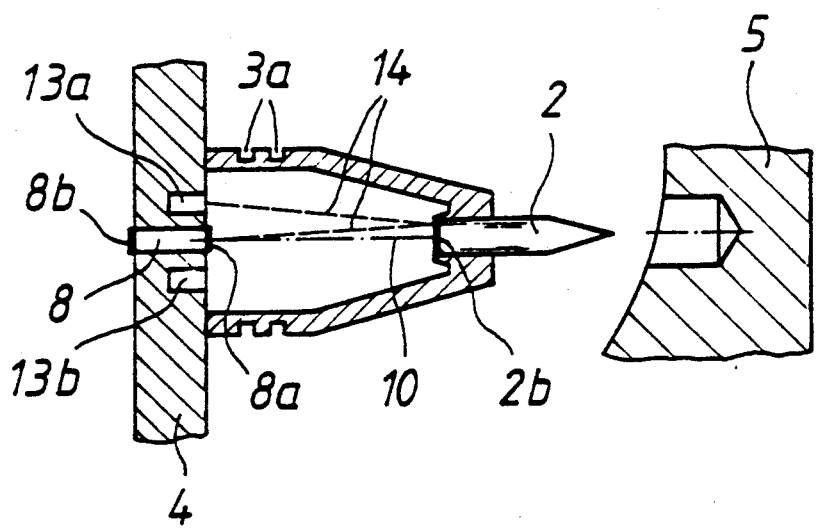
FIG. 4 shows an example in which the abrupt change from lasing to fluorescence operation is used in order to form a trigger.

FIG. 4 shows an arrangement of the laser diode 8 in the base 4 of the feeler 1, of the plane mirror 2b on the contact element 2, which is represented here as a cylinder/cone combination. FIG. 4 also shows monitor photodiodes 13a and 13b alongside the laser diode 8, which detect light that has taken the path from the laser diode 8 via the mirror 2b to the photodiodes 13a, 13b.

The optical construction thus initially looks like a conventional reflex light barrier. If the photodiodes 13a, 13b are part of an annular array, the tilting axis between mirror 2b and laser diode 8 can be deduced from the position of the reflex on the photodiode array in accordance with U.S. Pat. No. 4,574,199.

According to the present invention, the arrangement of the laser diode 8 with its end mirrors 8a and 8b, and of the mirror 2b is now embodied as coupled laser resonator, having three mirrors. For this purpose, the resonator quality and the operating conditions of the laser diode 8, such as current and temperature, are chosen in the basic setting such that precisely the threshold for the laser light emission is exceeded.

The laser beam 10 is narrowly bundled, so that virtually no light can fall upon the photodiodes 13a and 13b.

If the mirror 2b is tilted about a specific angle, the quality of the resonator is diminished, so, that the laser diode 8 passes over into fluorescent operation, and fluorescent light 14 of relatively high divergence is now emitted.

It follows that a considerable light intensity is incident upon the photodiode 13a which is determined by the tilting direction of the mirror 2b. Thus, the arrangement acts as a trigger.

As long as the threshold for laser light emission is not undershot owing to changes in position of the mirror 2b, this arrangement can operate like that according to FIG. 1, and the change in resonator quality can be detected by the electrical exciting current of the laser diode 8, or by an additional monitor photodiode. Because of the divergent light beam path to the photodiodes 13a, 13b, the beam 3 must be wider than the beam 3 in the embodiments of FIG. 1 to FIG. 3.

Figure 5:
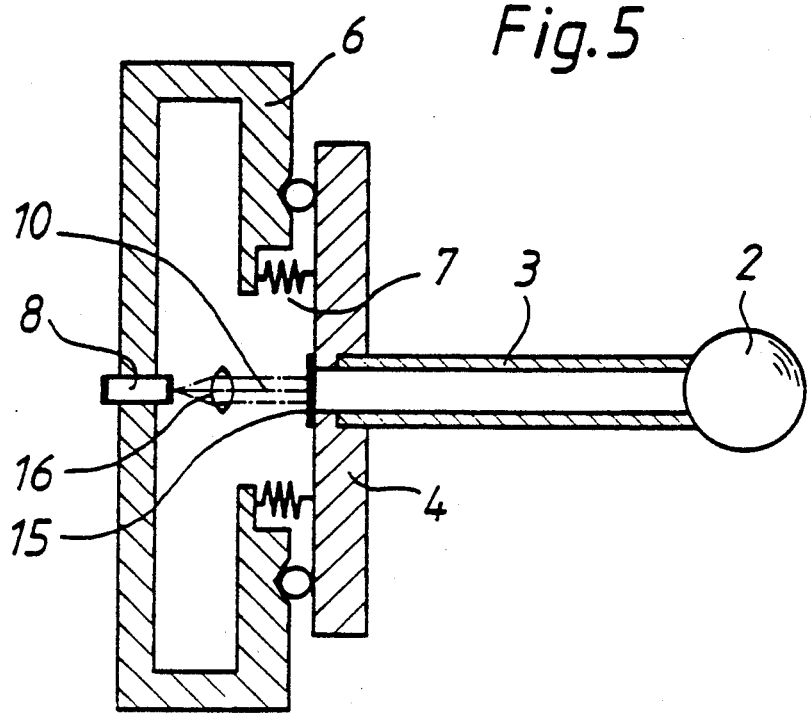
FIG. 5 shows an example with a lens in the beam path, and with the arrangement of the cavity facet on the base of the feeler pin.

As a modification of FIG. 3, FIG. 5 shows that the third cavity facet 15 can also be separated from the contact element 2. For this purpose, it is necessary to modify the known, stiff feeler pin designs according to the invention. In this regard, the cavity facet 15 is attached to the base 4 of the feeler pin 1. In addition, the use of a lens 16 in the beam path of the laser beam 10 is shown, so that the divergence of the light emitted by the laser diode 8 can be reduced, and the feedback improved. It is especially advantageous in this arrangement to use lens elements 16 having refractive index gradients.

Figure 6:
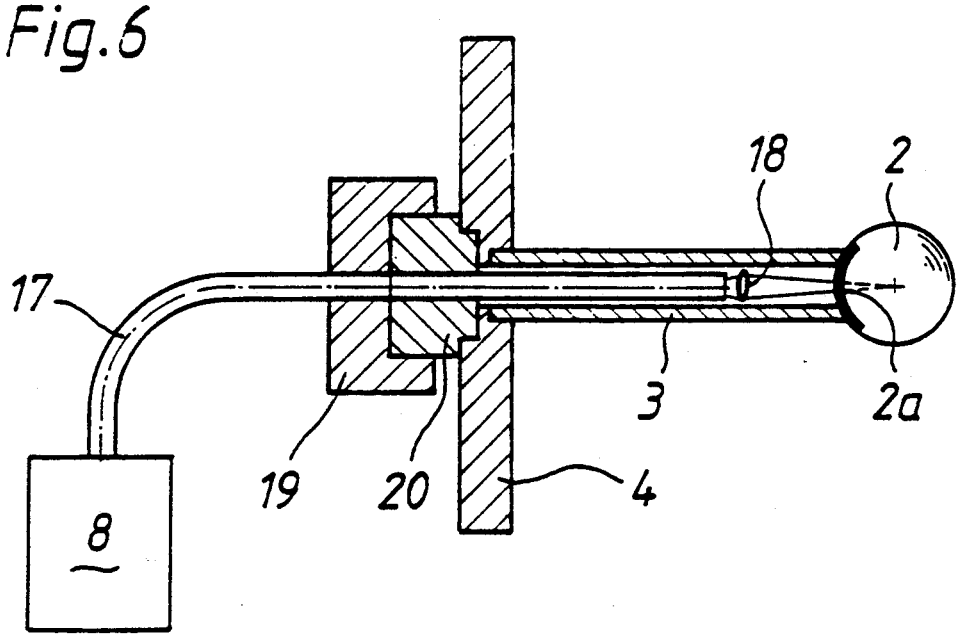
FIG. 6 shows an example with an optical fiber in the beam path.

In FIG. 6 an optical fiber 17 is inserted in the beam path between the laser diode 8 and the third cavity facet 2a on the contact element 2.

If the optical fiber is rigidly embodied in a free-standing fashion in the region of the beam 3, then the advantages of the arrangement according to FIG. 2 are achieved but the active components of laser diode 8 and, possibly, the photodiode 9 can be withdrawn onto the tilting bearing 6, as in the case of FIG. 3. Given the choice of a suitable optical fiber 17, e.g. a single mode fiber, the laser diode 8 can be withdrawn as far as into the control cabinet of the complete 3D measuring machine, to which the feeler pin 3 is attached. Electromagnetic disturbances can be suppressed in this way.

Also represented in FIG. 6 is the arrangement of a lens element 18 between the optical fiber 17 and the third cavity facet 2a. It is thus possible, as represented, for the emergent light to be focused onto the center of the ball of the contact element 2, wherein the ball forms the cavity facet 2a, so that the light impinges vertically onto the mirror surface.

FIG. 6 also shows that the optical fiber 17 can be provided with a connector 19 and socket 20 of commercial design. The entire feeler pin can then easily be exchanged.

The optical fiber 17 can also fill the entire length between the laser 8 and the third cavity facet 2a, 2b, that is to say, take the place of the cavity in the beam 3 of FIG. 1, and thus reduce light losses. It is then possible to do without lens element 16, 18, particularly if graded-index optical fibers are used as optical fibers 17. If the feeler element 2 comes into contact with an object 5, the optical fiber 17 is then bent or compressed. In the case of embodiments of the optical fiber 17 which respond to this with changes in optical characteristics, e.g. of the damping, or changes in the polarization characteristics, these change intensifying the change in quality of the resonator during feeling.

In order to render different feeling geometries possible, feeler pins 1 are often embodied in a modular system with a base 4, various beam elements 3b, contact elements 2 and branched and angled pieces. The individual elements are then combined as appropriate for a specific measuring task.

Figure 7:
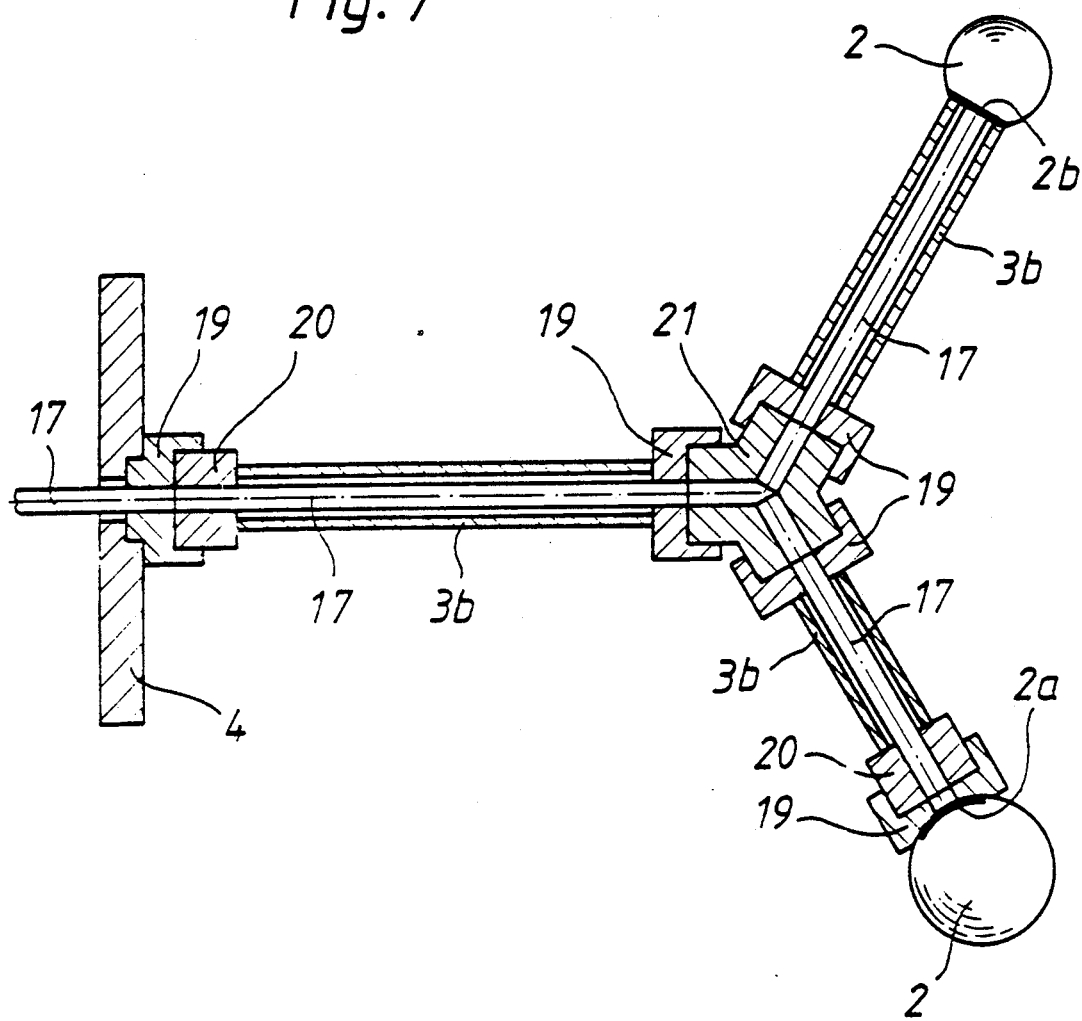
FIG. 7 shows a feeler pin in a modular system having plug-and-socket connections and branchings for optical fibers.

This can also be realized in the case of a feeler pin 1 according to the invention, as the example of FIG. 7 shows.

In this figure, the base 4 and beam element 3b are provided with optical fibers 17 and interconnection devices, embodied as optical fiber connector 19 and optical fiber socket 20. Contact elements 2 with the third cavity facet 2a, 2b can be fastened directly to beam elements 3b, or likewise be provided with connectors 19. Together with branching elements 21 for optical fibers 17, which are simultaneously constructed as mechanical branching elements for the beam elements 3b, it is then possible for all required feeler pin configurations to be realized.

The represented feeler pins according to the present invention are only examples. In particular, features can be combined with one another from different figures.

The electronic circuits 80 and terminals 81 (FIG. 1) required to operate a feeler according to the present invention are not described in more detail, since they are, e.g., known from the cited prior art, and can easily be adapted to the requirements in a 3D measuring machine.

However, the application of the feeler pin according to the present invention is not limited to 3D measuring machines, rather it can be used quite generally as a sensitive tactile sensor.

What is claimed is:

1. A feeler pin comprising:
   contact element means for contacting an external object, said contact element means pivotably movable from side-to-side; and
   a laser feedback interferometer means whose external reflector is coupled to said contact element means for sensing changes in resonator quality of said laser feedback interferometer means, said resonator quality corresponding to changes in a side-to-side movement of said contact element means with respect to an optical axis of said laser feedback interferometer means.

2. The feeler pin as claimed in claim 1, further comprising means for measuring radiation flux of a laser in said laser feedback interferometer means, said radiation flux being dependent upon said resonator quality.

3. The feeler pin as claimed in claim 1, wherein a laser in said laser feedback interferometer means is a laser diode with resistance measuring means for measuring internal resistance of said laser diode, said internal resistance corresponding to said resonator quality.

4. The feeler pin as claimed in claim 1, further comprising a laser driver limiting means for limiting operation of a laser in said laser feedback interferometer means in a region of threshold between fluorescence and lasing.

5. The feeler pin as claimed in claim 1, further comprising detector means for detecting light scattered by said external reflector, thereby detecting any abrupt increase in scattering intensity at large angles to a laser beam axis during transitions from lasing operation to fluorescence, said abrupt increase in scattering intensity corresponding to a change in said resonator quality.

6. A feeler pin as claimed in claim 1 wherein a laser from said laser feedback interferometer means is assigned to a base, and a mirror is rigidly arranged on said contact element means, said mirror operating as an external third cavity facet, thereby effecting a self-feedback of said laser, said contact element means being connected to said base with a beam element.

7. The feeler pin as claimed in claim 6, wherein said beam is a hollow tube, and said contact element means is a feeler ball, said feeler ball being fastened to one end of said hollow tube, and a surface of said feeler ball facing a portion of a cavity of said hollow tube, said mirror being a surface of said feeler ball.

8. The feeler pin as claimed in claim 6, wherein said laser is fastened to said base.

9. The feeler pin as claimed in claim 1, wherein said contact element means is mounted on a first end of a rigid beam, a second end of said rigid beam being mounted on a base, and wherein an external cavity reflector is mounted on said base, said base being movably mounted on a bearing element.

10. The feeler pin as claimed in claim 1, wherein optical fiber couples laser radiation from a laser in said laser feedback interferometer to said external reflector.

11. The feeler pin as claimed in claim 1, wherein a graded-index optical component couples radiation from a laser in said laser feedback interferometer means to said contact element means.

12. The feeler pin as claimed in claim 1, wherein polarizing optical elements couple radiation from a laser in said feedback interferometer means to said contact element means.

13. The feeler pin as claimed in claim 1, further comprising a current measuring means for measuring current of a laser diode in said laser feedback interferometer means, said current corresponding to said resonator quality.

14. The feeler pin as claimed in claim 1, further comprising a temperature measuring means for measuring temperature of a laser diode in said laser feedback interferometer means, said temperature corresponding to said resonator quality.

15. The feeler pin as claimed in claim 1, wherein a laser wavelength is modulated by varying the current and/or the temperature of a laser diode.

16. A feeler pin comprising:
   contact element means for contacting an external object; and a laser feedback interferometer means whose external reflector is coupled to said contact element means for sensing changes in resonator quality of said laser feedback interferometer means, said resonator quality corresponding to changes in position of said contact element means;

wherein a laser from said laser feedback interferometer means is assigned to a base, and a mirror is rigidly arranged on said contact element means, said mirror operating as an external third cavity facet, thereby effecting a self-feedback of said laser, said contact element means being connected to said base with a beam element and wherein said base is fastened to a movable tilting bearing element.

17. A feeler pin assembly comprising:
a first contact element means for contacting an external object;
a second contact element means for contacting said external object; and
a laser feedback interferometer means, having external reflectors coupled to said first and second contact element means, for sensing changes in resonator quality of said laser feedback interferometer means, said resonator quality corresponding to changes in position of at least one of said first and second contact element means.

18. A feeler pin assembly as set forth in claim 17, comprising:
a first branch beam element corresponding to said first contact element means, said first branch beam element including optical fibers, optical fiber couplers, and optical fiber branchings; and
a second branch beam element corresponding to said second contact element means, said second branch beam element including optical fibers, optical fiber couplers, and optical fiber branchings.

19. A feeler pin assembly as set forth in claim 17, wherein said first contact element means includes a first cavity facet and wherein said second contact element means includes a second cavity facet.

* * * * *